US008539688B2

(12) United States Patent
Wing

(10) Patent No.: US 8,539,688 B2
(45) Date of Patent: Sep. 24, 2013

(54) TRANSLUCENT BALL CAVITY CUBE VIAL

(75) Inventor: Vernon K. Wing, Chestnut Ridge, NY (US)

(73) Assignee: Vernon K. Wing, Long Island City, NY (US)

( * ) Notice: Subject to any disclaimer, the term of this patent is extended or adjusted under 35 U.S.C. 154(b) by 356 days.

(21) Appl. No.: 13/051,101

(22) Filed: Mar. 18, 2011

(65) Prior Publication Data
US 2012/0066921 A1 Mar. 22, 2012

Related U.S. Application Data

(60) Provisional application No. 61/325,776, filed on Apr. 19, 2010.

(51) Int. Cl.
G01C 9/36 (2006.01)
G01C 9/24 (2006.01)

(52) U.S. Cl.
USPC .............................. 33/390; 33/364

(58) Field of Classification Search
USPC ............... 33/390, 355 R, 364, 365, 377, 378, 33/379, 384, 389
See application file for complete search history.

(56) References Cited

U.S. PATENT DOCUMENTS

| 1,361,367 | A | * | 12/1920 | Coxey | 33/351 |
|---|---|---|---|---|---|
| 1,593,961 | A | * | 7/1926 | Wood | 33/390 |
| RE26,109 | E | * | 11/1966 | Brown | 33/313 |
| 5,704,130 | A | | 1/1998 | Augustin et al. | |
| 2004/0068880 | A1 | | 4/2004 | Bone et al. | |
| 2006/0254066 | A1 | | 11/2006 | Lang | |
| 2007/0023063 | A1 | | 2/2007 | Deuel | |
| 2009/0320303 | A1 | | 12/2009 | Sparrow | |
| 2010/0005671 | A1 | | 1/2010 | Hudson et al. | |

FOREIGN PATENT DOCUMENTS

| DE | 3024734 A | * | 2/1982 |
|---|---|---|---|
| DE | 3125510 A1 | * | 1/1983 |
| EP | 70476 A1 | * | 1/1983 |
| JP | 61182711 A | * | 8/1986 |
| JP | 07214408 A | * | 8/1995 |
| JP | 2006329740 A | * | 12/2006 |
| JP | 2007047140 A | * | 2/2007 |

OTHER PUBLICATIONS

Vernon K. Wing, Statement/Declaration, Mar. 17, 2011, 1 page, Attached.

* cited by examiner

Primary Examiner — R. A. Smith
(74) Attorney, Agent, or Firm — Vernon K Wing

(57) ABSTRACT

A ball cavity cube vial comprising a cube made of an at least translucent material, and having a sealed ball cavity in its center, said ball cavity being incompletely filled with a liquid medium such that a bubble is left inside of said ball cavity; and markings associated with said cube, said markings being calibrated to function as reference points for said bubble.

7 Claims, 3 Drawing Sheets

TRANSLUCENT BALL CAVITY CUBE VIAL

CROSS-REFERENCE TO RELATED APPLICATIONS

This application claims the benefit of U.S. Provisional Application No. 61/325,776, filed Apr. 19, 2010, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates generally to level instrument technology and particularly to level vials.

2. Description of the Related Art

Spirit levels are well known instruments used to plumb or set surfaces, such as horizontal or vertical surfaces. The most common spirit levels are the tubular levels and the circular levels.

Tubular spirit and circular bubble levels generally include one or more bubble vials, in which a fluid (e.g., mineral spirits, kerosene, or similar substances) is encapsulated within a sealed transparent (or at least translucent) body with an air space providing a visible bubble. Although glass was originally used to make bubble vials, today, acrylic is the material predominantly used for making molded vials, although other plastics are also used. Circular bubble levels are generally spherically domed shaped buttons, while tubular spirit levels are typically cylindrical shaped inside a rectangular solid.

Circular bubble levels are used for leveling of planes in two dimensions. While generally of greater accuracy than the circular levels, tubular levels can normally determine the level only in one dimension. Thus, when a surface or a device such a tripod has to be leveled with improved precision, a circular level is generally used for a quick but less precise leveling, and then, the precision is improved by using a tubular level in two dimensions. Hence, a user has to use two or more levels and to read two or more vials in order to level the respective tripod.

Furthermore, when tubular spirit vials are used, if the spirit level instrument is to accommodate multiple planar orientations, such as horizontal, vertical and 45 degrees orientations, a separate spirit level vial is usually provided for each planar orientation of interest. Again, the user has to read different vials, one for each planar orientation of interest.

In both examples, the process is cumbersome and time consuming for the user as he/she needs to read multiple vials. Thus, a need exist for better vials and levels, which address these problems.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment a bubble inside a ball cavity cube vial ("cube vial"), filled with a liquid medium, serves as an indicant of level. The cube may have markings or reference points on all of its faces. For example, the cube may have a bull's eye marking on the "top" face and fine angle markings on all of its lateral faces. Thus, with the cube vial, a device such as tripod may be leveled with increased accuracy using a single vial (i.e., the cube vial) without the need of using and reading multiple vials such as a circular vial and one or more tubular vials. Hence, an advantage of the cube vial is the possibility of accurately leveling planes in two dimensions or in one dimension with the same vial. Another advantage is to provide simultaneous multiple dimensional readings from the translucent ball cavity cube vial. Another advantage is that the cube vial may accommodate multiple planar orientations, such as horizontal, vertical and 45 degrees orientations.

In another exemplary embodiment a ball bearing may be added to the inside of the ball cavity of the cube vial. This may increase the accuracy of the readings and may permit dual readings, one using the bubble (e.g., angle reading), and one using the ball bearing (e.g., pitch reading).

In another exemplary embodiment a compass ball may be added to the inside of the ball cavity of the cube vial. This configuration may convert the cube vial in an instrument with two useful functions, a level function and a compass function.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 3a illustrates a perspective view of the cube vial from FIG. 1 to which a globe was added, according to other embodiments.

FIGS. 3b-d illustrate the top, the front and the side view, respectively, of the cube vial from FIG. 3a.

DETAILED DESCRIPTION OF THE PREFERRED EMBODIMENTS

Figure 1:
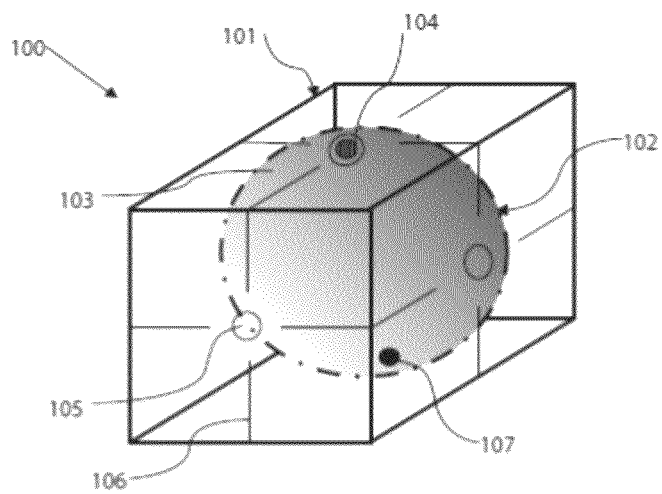
FIG. 1 illustrates a perspective view of a cube vial according to several embodiments.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the present invention. Therefore, the scope of the present invention is defined by the accompanying claims and their equivalents.

Figures 2A, 2B, 2C:
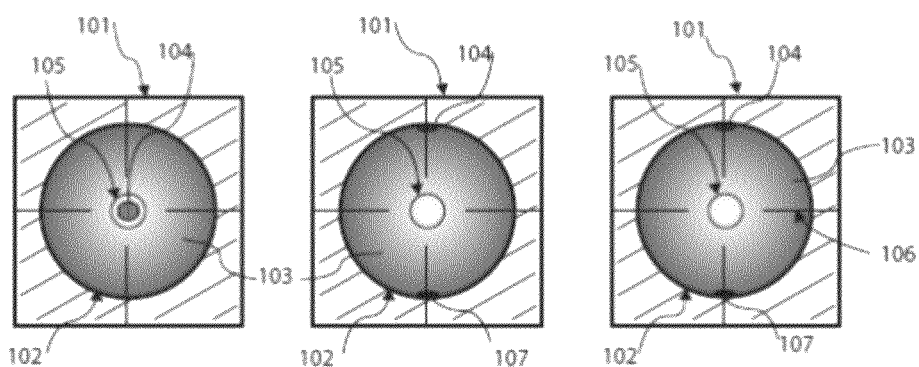
FIGS. 2a-c illustrate the top, the front and the side view, respectively, of the cube vial from FIG. 1.

FIG. 1 illustrates a perspective view of a cube vial 100 according to several embodiments. FIGS. 2a-c illustrate the top, the front and the side view, respectively, of the cube vial 100 from FIG. 1. The cube vial 100 comprises a transparent or translucent cube 101 with a sealed ball cavity 102 centered inside the cube 101. The ball cavity 102 is filled with a liquid medium 103 containing a single small bubble 104 and may include a free rolling ball bearing 107 to provide an additional reference point. The ball cavity 102 has a spherical shape, with a 360 degrees spherical roundness, and with smooth surface to eliminate or reduce friction. The liquid medium 103 may be any liquid which is commonly used in spirit level vials such as alcohol, mineral spirits, kerosene, etc. The liquid medium 103 should be tolerant of freezing and should allow the bubble 104 and/or the ball bearing 107 to move freely under the influence of gravitational forces. The ball bearing 107 may be made of ferrous or non-ferrous (corrosion resistant) materials.

Because of its lower density than that of the liquid medium 103, the bubble 104 is oriented at the top of the ball cavity 102, regardless of the cube's 101 orientation. The ball bearing 107, which has a higher density than that of the liquid medium 103, is oriented at the bottom of the ball cavity 102, regardless of the cube's 101 orientation. Thus, to determine level, the cube 101 may be positioned, on a surface of interest, on any of the cube's six faces. Hence, for any surfaces, such as horizontal or vertical surfaces, level may be determined with this cube vial 100. Additionally, the bubble 104 and the ball bearing 107 can be seen from each unobstructed side of the cube 101. Furthermore, because of its rectangular corners, the cube vial 100 may be used as a square. These features makes the cube vial 100 a very versatile tool, especially when used as a standalone instrument.

As suggested and shown in FIG. 1 and FIGS. 2a-c, calibrated reference lines 106 and bull's eye 105 markings may be provided on each side of the cube 101 for level point determination. Four line markings 106 are shown on each side of the cube 101. Thus, as explained earlier, the cube vial 100 may be placed, on a surface of interest, with any of the cube's sides facing that surface. In order to determine and/or set the level of, for example, a horizontal surface such as the plate of a tripod, a user may look first at the top of the cube (FIG. 2a) to compare the location of the bubble 104 with the bull's eye marking 105. When the bubble 104 is inside the bull's eye marking 105, the surface is roughly leveled. To fine tune the level of the surface, the user may then look at, for example, the front of the cube (FIG. 2b) and one of the sides of the cube (FIG. 2c), in order to refine the level of the surface in two perpendicular dimensions. When the bubble 104 (and the ball bearing 107 if present) is aligned with one of the four line markings 106 which is in its proximity, the surface is leveled in the respective dimension. Thus, with a single vial, positioned one time, in one spot, a user may fine tune the level of a horizontal surface.

Similarly, a user may determine and/or set the verticality of an object, such as a metal post having L-shaped and right-angled cross-section, by positioning the cube vial 100, one time, "inside" the post, so that the cube vial 100 touches both of the inside right-angled surfaces of the post. Then, again, the user may look at the top (FIG. 2a) of the cube vial 100 for the bubble 104 to be inside bull's eye marking 105, and then, refine the verticality of the post in two dimensions by looking at the front (FIG. 2b) and the unobstructed side (FIG. 2c) of the cube vial 100.

Furthermore, when appropriate markings are provided, such as the ones depicted in FIGS. 4b-e, the cube vial 100 may be used to determine and/or set the inclination of a surface of interest, such as the top surface of a concrete slab used for pavement, in two dimensions, at the same time, with only one positioning of the cube vial. Again, for an approximate reading, the user may look at the top (FIG. 2a) of the cube vial 100, if a bull's eye marking 105 is present on that surface, and then, refine the reading and/or the setting of the inclination in two dimensions of the respective surface, by looking at the front and the side of the cube vial 100 for a degree and/or pitch reading.

Figures 4A, 4B, 4C:
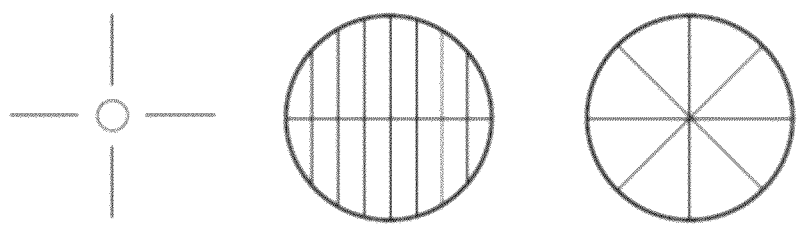
FIGS. 4a-e illustrate various marking templates, which may be applied to the faces of the cube vial.
Figures 4D, 4E:
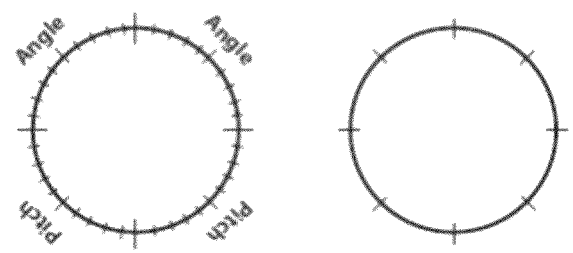

In addition, when a dual marking such as the one depicted in FIG. 4d is provided, and both, the bubble 104 and the ball bearing 107 are present, two distinct readings may be made. For example, the bubble 104 may enable the reading of the angle, and the ball bearing 107 may enable the reading of the pitch of a surface in the dimension corresponding to the orientation of the face of the cube on which the dual marking is located. It should be apparent that when the dual marking is present on at least two adjoining lateral faces of the cube, two distinct readings may be made for a surface of interest, in two dimensions.

Figures 3A, 3B, 3C, 3D:
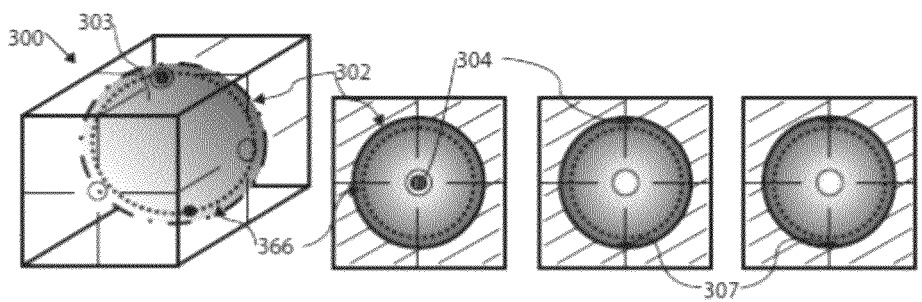

FIG. 3a illustrates a perspective view of the cube vial 100 from FIG. 1 to which a globe 366 was added, according to other embodiments. FIGS. 3b-d illustrate the top, the front and the side view, respectively, of the cube vial 300 from FIG. 3a. As described earlier, the instrument (i.e., the cube vial) can be positioned on a surface or plane of interest and the indicant (i.e., the bubble 304) in the ball cavity 302, which is filled with the liquid medium 303, may be used to determine level. If an accompanying free floating globe 366 and/or a ball bearing 307 are/is present in the ball cavity 302, these/this indicant(s) provide(s) for additional level reference(s), thus, providing the instrument with a fuller planar axis range. So, it should be apparent that the cube vial 300 may be configured to have as indicants of level a combination of the three indicants (i.e., the bubble 304, the globe 366 and the ball bearing 307), such as, bubble and globe, or, bubble, globe and ball bearing. The globe 366 may have meridian line markings to serve as references. Furthermore, the globe 366 may be a magnetized ball, such as the one used in a ball compass, and marked and calibrated to show direction relative to the Earth's magnetic poles. Thus, the cube vial 300 may be configured to function as a level instrument and a compass, in the same time.

FIGS. 4a-e illustrate various marking templates, which may be applied to the faces of the cube vial 100. The markings depicted in FIG. 4a (bull's eye and line markings) may be combined with other markings, such as the markings depicted in FIGS. 4d-e, on at least one of the six faces of the cube vial 100. In order to provide for fixed planar orientations of interest, as described earlier, different calibrated reference line marking templates can be imprinted onto each surface of the cube, on a sandwiched collar perimeter around the ball cavity, or inscribed onto surface of the ball cavity to minimize parallax errors. Again, some examples of the imprinted calibrated templates on the surface of the cube are shown in FIGS. 4a-e.

Figure 5:
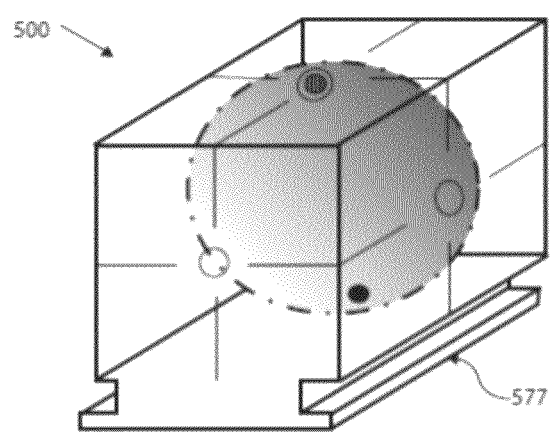
FIG. 5 illustrates a perspective view of the cube vial from FIG. 1 to which a footing base was added according to another embodiment.

FIG. 5 illustrates a perspective view of the cube vial 100 from FIG. 1 to which a footing base 577 was added, according to another embodiment. The footing base 577 is associated with the cube vial 500 and may be configured to fit onto a standard receiver such as a SLR camera hot shoe. Without the footing base 577, the cube vial 500 may fit onto any instrument with external retaining holder, or, it may be used standalone.

Here are some examples of applications for the cube vial: when a user of the cube vial is interested in sloping a kitchen counter top, so water will run off toward a desired direction at a specific pitch, the user may place the cube vial on top surface of the counter top and tilt it so indicant (e.g, bubble) is at desired direction and pitch; when positioning a satellite dish at a specific elevation angle and direction to a satellite at a designated horizon point, the cube vial may be placed on dish in order to determine elevation angle and direction to satellite; when hanging a picture frame, level with a tilting forward angle of, for example, 30 degrees, the cube vial may be placed on top of picture frame and adjust frame to horizontal, plumb and desired forward angle; when installing a door frame, so that it is plumb and level, without the need to reorient the level instrument, the cube vial may be placed on the inside corner of door frame, and then, the door frame may be adjusted, so that it is plumb and level and without forward or backward pitch; when orienting a camera to a specific position on top of a tripod, a cube vial with a hot shoe base may be placed on the camera's hot shoe, and then, the camera may be positioned to desired horizontal and/or vertical orientation by reading of indicant against the calibrated markings on the cube. Thus, with a cube vial, one can simultaneously determine accurate orientation relative to one, two, or three dimensions and viewing of the indicant(s) is facilitated from several different directions.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions, such as alternative materials, structures, configurations, methods, circuits, devices and components, alternatives as to form, fit and function, and so on, may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the present invention. Therefore, the scope of this application is intended to cover alternate embodiments and/or equivalent variations of the specific embodiments illustrated and/or described herein. Hence, the scope of the present invention is defined by the accompanying claims and their equivalents. Furthermore, each and every claim is incorporated as further disclosure into the specification and the claims are embodiment(s) of the present invention.

What is claimed is:

1. An artifact comprising:
   a cube made of an at least translucent material, and having a sealed ball cavity in its center, said ball cavity being incompletely filled with a liquid medium such that a bubble is left inside of said ball cavity;
   a freely floating globe inside said ball cavity; and
   markings associated with said cube, said markings being calibrated to function as reference points for said bubble and the globe.

2. The artifact of claim 1, wherein said material is transparent.

3. The artifact of claim 1, wherein said liquid medium is an alcohol.

4. The artifact of claim 1, wherein said markings are indicating degrees.

5. The artifact of claim 1, further comprising a footing base.

6. The artifact of claim 1, wherein the globe is magnetized, marked and calibrated to show direction relative to Earth's magnetic poles.

7. The artifact of claim 1, further comprising a ball bearing, made of a material having greater density than that of said liquid medium, and wherein, said ball bearing is rolling freely inside said ball cavity.

* * * * *